United States Patent
Wang et al.

(10) Patent No.: US 11,239,767 B1
(45) Date of Patent: Feb. 1, 2022

(54) INVERTER SYSTEM, METHOD FOR CONTROLLING INVERTER SYSTEM, AND PARALLEL INVERTER SYSTEM

(71) Applicant: ECOFLOW INC., Shenzhen (CN)

(72) Inventors: Lei Wang, Shenzhen (CN); Xi Chen, Shenzhen (CN); Hongyu Qian, Shenzhen (CN)

(73) Assignee: ECOFLOW INC., Shenzhen (CN)

( * ) Notice: Subject to any disclaimer, the term of this patent is extended or adjusted under 35 U.S.C. 154(b) by 0 days.

(21) Appl. No.: 17/484,403

(22) Filed: Sep. 24, 2021

Related U.S. Application Data

(63) Continuation of application No. PCT/CN2021/108110, filed on Jul. 23, 2021.

(30) Foreign Application Priority Data

Jan. 14, 2021 (CN) .......................... 202110045449.X

(51) Int. Cl.
  *H02M 7/493* (2007.01)
  *H02M 7/5387* (2007.01)
  (Continued)

(52) U.S. Cl.
  CPC ............. *H02M 7/493* (2013.01); *H02J 3/38* (2013.01); *H02M 1/007* (2021.05); *H02M 7/53871* (2013.01)

(58) Field of Classification Search
  CPC .. H02M 7/493; H02M 1/007; H02M 7/53871; H02J 3/38
  See application file for complete search history.

(56) References Cited

U.S. PATENT DOCUMENTS

| 6,075,328 A * | 6/2000 | Notohara .................. H02P 6/20 |
| | | 318/400.09 |
| 2015/0270787 A1* | 9/2015 | Fujisaki .............. H02M 7/5387 |
| | | 363/41 |

(Continued)

FOREIGN PATENT DOCUMENTS

| CN | 2715409 Y | 8/2005 |
| CN | 101123352 A | 2/2008 |

(Continued)

OTHER PUBLICATIONS

The World Intellectual Property Organization (WIPO) International Search Report for PCT/CN2021/108110 dated Oct. 26, 2021 5 Pages.

*Primary Examiner* — Jared Fureman
*Assistant Examiner* — Duc M Pham
(74) *Attorney, Agent, or Firm* — Anova Law Group, PLLC

(57) ABSTRACT

An inverter system, including a pre-conversion circuit, a post-conversion circuit, and a control circuit; the pre-conversion circuit is configured to convert a voltage of a power supply into a DC voltage and output the DC voltage to the post-conversion circuit; a voltage between the pre-conversion circuit and the post-conversion circuit is a DC bus voltage; the post-conversion circuit is configured to output an alternating current; the control circuit is configured to detect a DC component of an output terminal of the post-conversion circuit, calculate a difference value of a zero value and the DC component to obtain a DC component deviation value, and perform PI adjustment on the DC component deviation value to obtain a voltage compensation value; the voltage compensation value is used to adjust the DC bus voltage.

17 Claims, 4 Drawing Sheets

(51) Int. Cl.
*H02M 1/00* (2006.01)
*H02J 3/38* (2006.01)

(56) References Cited

U.S. PATENT DOCUMENTS

2018/0026539 A1* 1/2018 Kobayashi ........... G01R 19/165
   323/271
2018/0348284 A1* 12/2018 Tateda ................... G01R 31/64

FOREIGN PATENT DOCUMENTS

| CN | 101567638 A | 10/2009 | |
|---|---|---|---|
| CN | 102480243 A | 5/2012 | |
| CN | 112366970 A | 2/2021 | |
| EP | 2621046 A1 * | 7/2013 | ................ H02J 3/38 |

* cited by examiner

INVERTER SYSTEM, METHOD FOR CONTROLLING INVERTER SYSTEM, AND PARALLEL INVERTER SYSTEM

CROSS-REFERENCES TO RELATED APPLICATIONS

The present application is a continuation application of PCT Patent Application No. PCT/CN2021/108110, filed on Jul. 23, 2021, which claims priority of Chinese Patent Application No. 202110045449.X, filed with the Chinese National Intellectual Property Administration on Jan. 14, 2021, entitled "INVERTER SYSTEM, METHOD FOR CONTROLLING INVERTER SYSTEM, AND PARALLEL INVERTER SYSTEM", the content of all of which is incorporated herein by reference in their entity.

TECHNICAL FIELD

The present application relates to the field of power supply technologies, and particularly to an inverter system, an inverter system control method, and a parallel inverter system.

BACKGROUND

The statements here only provide background information related to the present application, and do not necessarily constitute an exemplary technology.

Capacity of a power supply device of a single inverter system is limited, but the power capacity can be increased and the reliability of the power supply can be improved by using a technology connecting inverter systems in parallel. Parallel systems (also known as alternating current (AC) parallel systems) in which the inverter systems output AC can be classified into two types according to input conditions, the AC parallel system that shares a DC (direct current) bus, and the AC parallel system that does not share the DC bus. However, these two types of AC parallel systems often have a problem of circular DC current.

For example, in the AC parallel system sharing a DC bus, due to non-ideal factors such as switching speed, saturation voltage drop, dead time, sampling error, and driving difference etc., of a switching transistor in the inverter bridge circuit, volt-second product of center point voltages of a bridge arm during one power frequency cycle is not equal to zero, so that the AC output voltage of the inverter system contains a DC component. Since internal impedance of the inverter system is very small, a small DC voltage component can produce a large circular DC current. The presence of the circular DC current not only reduces the efficiency of the inverter power supply, but also easily causes serious consequences such as inductance saturation and power device damage etc.

For example again, in the AC parallel system that does not share the DC bus, in addition to the same factors as the AC parallel system sharing the DC bus, there is a worse factor, i.e., the voltages of the DC buses of the inverter systems in this system are inconsistent. In the case that the voltages of the DC buses are inconsistent, even if the non-ideal factors of the inverter systems themselves are ignored, the circular DC current cannot be eliminated. In the system that does not share the DC bus, the presence of the circular DC current often makes the voltage of the DC bus too large, thereby resulting in damage to a bus capacitor on the DC side.

Therefore, application scenarios of parallel inverter systems are often limited to situations where DC buses (micro-grids) must be connected in parallel, or situations that the voltage levels of the DC buses within different inverter systems need to be basically the same, which leads to substantial impossibility for products from different manufacturers or with different models to achieve parallel operation of AC outputs.

SUMMARY

According to embodiments in the present application, an inverter system, a method for controlling an inverter system, and a parallel inverter system are provided.

An embodiment in the present application provides an inverter system, which includes a pre-conversion circuit, a post-conversion circuit, and a control circuit;

an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;

an output terminal of the post-conversion circuit is configured to connect to an AC load, and a signal control terminal of the post-conversion circuit is connected to the output terminal of the control circuit;

the pre-conversion circuit is configured to convert a voltage of the power supply into a DC voltage and output the DC voltage to the post-conversion circuit; the DC voltage between the pre-conversion circuit and the post-conversion circuit is a DC bus voltage;

the post-conversion circuit is configured to convert the DC bus voltage into an AC voltage;

the control circuit is configured to detect a DC component of the output terminal of the post-conversion circuit;

the control circuit is configured to calculate a difference value of a zero value and the DC component to obtain a DC component deviation value, perform PI adjustment on the DC component deviation value to obtain a voltage compensation value, and adjust the DC bus voltage between the pre-conversion circuit and the post-conversion circuit according to a preset DC voltage reference value and the voltage compensation value.

In one embodiment, the post-conversion circuit includes a bridge inverter unit and an inductor;

an input terminal of the bridge inverter unit is connected to the output terminal of the pre-conversion circuit, an output terminal of the bridge inverter unit is connected to the inductor in series, and a signal control terminal of the bridge inverter unit is connected to the output terminal of the control circuit;

the control circuit is configured to detect the DC component of a voltage between midpoints of bridge arms in the bridge inverter unit or detect the DC component of a current passing through the inductor.

In the above embodiment, the bridge inverter unit is a two-phase bridge inverter circuit or a three-phase bridge inverter circuit.

In one embodiment, before the post-conversion circuit is switched into an operational state, the control circuit is configured to control the pre-conversion circuit to convert the power supply into an initial DC bus voltage according to the preset DC voltage reference value and then output the initial DC bus voltage to the post-conversion circuit.

In one embodiment, the control circuit includes a pre-loop controller and a post-loop controller, and a signal terminal of the pre-loop controller and a signal terminal of the post-loop controller are communication connected through a serial port or a bus;

the signal control terminal of the pre-conversion circuit is connected to an output terminal of the pre-loop controller, and the signal control terminal of the post-conversion circuit is connected to an output terminal of the post-loop controller;

the pre-loop controller is configured to control the pre-conversion circuit to output the DC voltage;

the post-loop controller is configured to control the post-conversion circuit to output an alternating current.

In one embodiment, the pre-loop controller includes a DC circulation control module, a first voltage loop, a first current loop, and a pre-PWM driving module;

an input terminal of the DC circulation control module is connected to the post-loop controller, an input terminal of the first voltage loop is connected to an output terminal of the DC circulation control module, an input terminal of the first current loop is connected to an output terminal of the first voltage loop, an output terminal of the first current loop is connected to an input terminal of the pre-PWM driving module, and an output terminal of the pre-PWM driving module is connected to the signal control terminal of the pre-conversion circuit;

the DC circulation control module is configured to obtain the DC component, calculate the difference value of the zero value and the DC component to obtain the DC component deviation value, and adjust the DC component deviation value through a preset PI adjustment coefficient to obtain the voltage compensation value;

the first voltage loop is configured to calculate a corrected voltage value according to the preset DC voltage reference value and the voltage compensation value, and calculate a first voltage value according to a DC voltage value sampled at the output terminal of the pre-conversion circuit and the corrected voltage value;

the first current loop is configured to calculate a pre-control signal quantity according to the first voltage value and a current value sampled in the pre-conversion circuit;

the pre-PWM driving module is configured to drive a switch transistor in the pre-conversion circuit according to the pre-control signal quantity to output the DC voltage.

In one embodiment, the post-loop controller includes a DC component sampling module; and a second voltage loop, a second current loop, and a post-PWM driving module connected in sequence;

an input terminal of the DC component sampling module is connected to the output terminal of the post-conversion circuit, and an output terminal of the post-PWM driving module is connected to the signal control terminal of the post-conversion circuit;

the DC component sampling module is configured to sample a DC component signal from the output terminal of the post-conversion circuit, and convert the sampled signal through an AD converter to obtain the DC component; the post-loop controller transmits the DC component to the pre-loop controller by means of communication;

the second voltage loop is configured to calculate a second voltage value according to a preset AC voltage reference value and an AC voltage value sampled at the output terminal of the post-conversion circuit;

the second current loop is configured to calculate a post-control signal quantity according to the second voltage value and the current value sampled in the post-conversion circuit;

the post-PWM driving module is configured to drive a switch transistor in the post-conversion circuit according to the post-control signal quantity to output an alternating current.

In one embodiment, the pre-conversion circuit is a DC-DC conversion circuit or an AC-DC conversion circuit.

In one embodiment, the post-conversion circuit further includes a capacitor connected in parallel to the output terminal of the bridge inverter unit.

In one embodiment, the bridge inverter unit includes a plurality of bridge arm structures with each of the bridge arm structure comprising two power switch transistors connected in series.

In one embodiment, the pre-conversion circuit is a Buck circuit, a Boost circuit, or a voltage conversion circuit including a switch transistor device.

In one embodiment, the DC circulation control module includes a subtractor and a PI regulator;

the subtractor is configured to realize the calculation of the difference value of the zero value and the DC component to obtain the DC component deviation value;

the PI regulator is configured to adjust the DC component deviation value through a preset PI adjustment coefficient to obtain the voltage compensation value.

An embodiment in the present application further provides an inverter system, which includes a pre-conversion circuit, a post-conversion circuit, and a control circuit;

an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;

an output terminal of the post-conversion circuit is configured to connect to an AC load, and a signal control terminal of the post-conversion circuit is connected to the output terminal of the control circuit;

the pre-conversion circuit is configured to convert a voltage of the power supply into a DC voltage and output the DC voltage to the post-conversion circuit; the DC voltage between the pre-conversion circuit and the post-conversion circuit is a DC bus voltage;

the post-conversion circuit is configured to convert the DC bus voltage into an AC voltage;

the control circuit is configured to detect a DC component of the output terminal of the post-conversion circuit;

the control circuit is configured to calculate a difference value of a zero value and the DC component to obtain a DC component deviation value, perform PI adjustment on the DC component deviation value to obtain a voltage compensation value, and adjust the DC bus voltage between the pre-conversion circuit and the post-conversion circuit according to a preset DC voltage reference value and the voltage compensation value;

the control circuit includes a pre-loop controller and a post-loop controller, and a signal terminal of the pre-loop controller and a signal terminal of the post-loop controller are communication connected through a serial port or a bus;

the signal control terminal of the pre-conversion circuit is connected to an output terminal of the pre-loop controller, and the signal control terminal of the post-conversion circuit is connected to an output terminal of the post-loop controller;

the pre-loop controller includes a DC circulation control module, a first voltage loop, a first current loop, and a pre-PWM driving module;

an input terminal of the DC circulation control module is connected to the post-loop controller, an input terminal of the first voltage loop is connected to an output terminal of the DC circulation control module, an input terminal of the first current loop is connected to an output terminal of the first voltage loop, an output terminal of the first current loop is connected to an input terminal of the pre-PWM driving module, and an output terminal of the pre-PWM driving module is connected to the signal control terminal of the pre-conversion circuit;

the DC circulation control module is configured to obtain the DC component, calculate the difference value of the zero value and the DC component to obtain the DC component deviation value, and adjust the DC component deviation value through a preset PI adjustment coefficient to obtain the voltage compensation value;

the first voltage loop is configured to calculate a corrected voltage value according to the preset DC voltage reference value and the voltage compensation value, and calculate a first voltage value according to a DC voltage value sampled at the output terminal of the pre-conversion circuit and the corrected voltage value;

the first current loop is configured to calculate a pre-control signal quantity according to the first voltage value and a current value sampled in the pre-conversion circuit;

the pre-PWM driving module is configured to drive a switch transistor in the pre-conversion circuit according to the pre-control signal quantity to output the DC voltage.

An embodiment in the present application further provides a method for controlling an inverter system, the inverter system includes a pre-conversion circuit, a post-conversion circuit, and a control circuit;

an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;

an output terminal of the post-conversion circuit is configured to connect to an AC load, and a signal control terminal of the post-conversion circuit is connected to the output terminal of the control circuit;

the pre-conversion circuit is configured to convert a voltage of the power supply into a DC voltage and output the DC voltage to the post-conversion circuit; the DC voltage between the pre-conversion circuit and the post-conversion circuit is a DC bus voltage;

the post-conversion circuit is configured to convert the DC bus voltage into an AC voltage;

the control circuit implements a method as follows for inverter control, and the method includes:

detecting a DC component of the output terminal of the post-conversion circuit;

calculating a difference value of a zero value and the DC component to obtain a DC component deviation value, and performing PI adjustment on the DC component deviation value to obtain a voltage compensation value;

adjusting the DC bus voltage between the pre-conversion circuit and the post-conversion circuit according to a preset DC voltage reference value and the voltage compensation value.

In one embodiment, the method for controlling an inverter system further includes:

after the power supply is accessed, controlling, by the control circuit, the pre-conversion circuit to convert an input of the accessed power supply into an initial DC bus voltage according to a preset DC voltage reference value, and then outputting the initial DC bus voltage to the post-conversion circuit;

detecting, by the control circuit, whether the post-conversion circuit is switched into an operational state;

after detecting that the post-conversion circuit is switched into the operational state, executing, by the control circuit, step of detecting the DC component of the output terminal of the post-conversion circuit and the subsequent steps.

In one embodiment, the method for controlling an inverter system further includes:

if it is detected that the post-conversion circuit is not switched into the operational state, controlling, by the control circuit, the pre-conversion circuit to continuously output the initial DC bus voltage to the post-conversion circuit.

An embodiment in the present application further provides a parallel inverter system, which includes a plurality of inverter systems, AC output terminals of the plurality of inverter systems are connected in parallel, and each of the inverter systems includes a pre-conversion circuit, a post-conversion circuit, and a control circuit;

an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;

an output terminal of the post-conversion circuit is configured to connect to an AC load, and a signal control terminal of the post-conversion circuit is connected to the output terminal of the control circuit;

the pre-conversion circuit is configured to convert a voltage of the power supply into a DC voltage and output the DC voltage to the post-conversion circuit; the DC voltage between the pre-conversion circuit and the post-conversion circuit is a DC bus voltage;

the post-conversion circuit is configured to convert the DC bus voltage into an AC voltage;

the control circuit is configured to detect a DC component of the output terminal of the post-conversion circuit;

the control circuit is configured to calculate a difference value of a zero value and the DC component to obtain a DC component deviation value, perform PI adjustment on the DC component deviation value to obtain a voltage compensation value, and adjust the DC bus voltage between the pre-conversion circuit and the post-conversion circuit according to a preset DC voltage reference value and the voltage compensation value.

Details of one or more embodiments in the present application are provided in the accompanying drawings and the following description. Other features, purposes and advantages of the present application will become apparent from the description, accompanying drawings and appended claims.

DESCRIPTION OF THE DRAWINGS

In order to more clearly illustrate the technical solutions in the embodiments in the present application, the drawings needed to be used in the embodiments will be briefly introduced below. It should be understood that the accompanying drawings only show some embodiments in the present application, which thus cannot be construed as limitation to the scope. For those of ordinary skill in the art, other drawings may be obtained based on these drawings without paying any creative effort.

Figure 1:
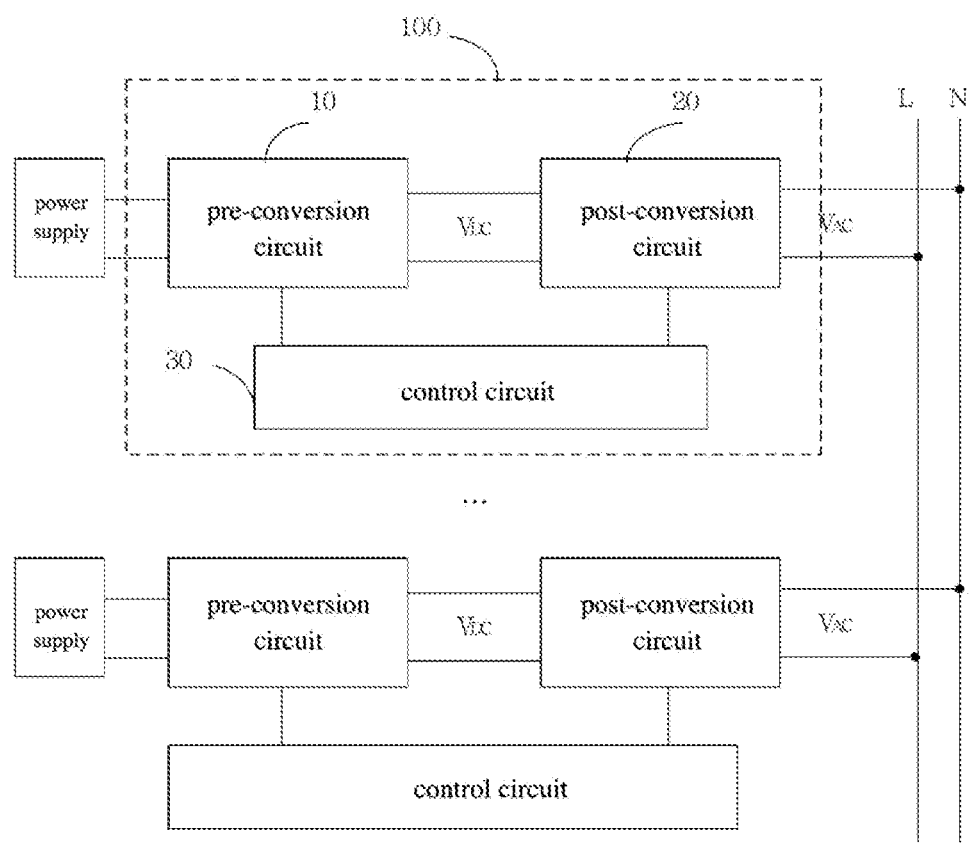
FIG. 1 shows a structural schematic diagram of a parallel inverter system according to an embodiment in the present application.

Illustration of reference signs of main components: 100—inverter system; 10—pre-conversion circuit; 20—post-conversion circuit; 30—control circuit; 310—pre-loop controller; 311—first voltage loop; 312—first current loop; 313—pre-PWM driving module; 314—DC circulation control module; 320—post-loop controller; 321—second voltage loop; 322—second current loop; 323—post-PWM driving module; 324—DC component sampling module.

DETAILED DESCRIPTION

The embodiments in the present application are described in detail below. Examples of the embodiments are shown in the accompanying drawings, in which the same or similar reference numerals, throughout the present application, indicate the same or similar elements or indicate elements with the same or similar functions. The embodiments described below with reference to the accompanying drawings are exemplary, and are only used to explain the present application, but cannot be understood as a limitation to the present application.

It should be noted that when an element is referred to as being "fixed to" another element, this element may be directly on the another element, or there may be an intermediate element. When an element is considered to be "connected" to another element, this element may be directly connected to the another element, or there may be an intermediate element at the same time. In contrast, when an element is referred to as being "directly on" another element, there is no intermediate element. The terms "vertical", "horizontal", "left", "right" and similar expressions used herein are for illustrative purposes only.

In the present application, the terms "installation", "connection", "engagement", "fixation" and the like should be understood in a broad sense, unless otherwise clearly specified and limited. For example, the connection may be a fixed connection or a detachable connection, or may be a one piece; the connection may be a mechanical connection or an electrical connection; the connection may be a direct connection or an indirect connection through an intermediate medium, and the connection may be an internal communication of two components or an interaction relationship between two components. For those of ordinary skill in the art, the specific meanings of the above-mentioned terms in the present application can be understood according to specific circumstances.

In addition, the terms "first" and "second" are only used for descriptive purposes, and cannot be understood as an indication or implication of relative importance or an implicit indication of the number of an indicated technical feature. Thus, the features defined with "first" and "second" may explicitly or implicitly include one or more of these features. In the description of the present application, "a plurality of" means two or more than two, unless otherwise explicitly and specifically defined.

Unless otherwise defined, all technical and scientific terms used herein have the same meanings as those commonly understood by those skilled in the technical field of the present application. The terms used in the description of the template herein are only for the purpose of describing specific embodiments, and are not intended to limit the present application. The term "and/or" as used herein includes any combination and all combinations of one or more items listed in association.

In a traditional technology, when a plurality of inverter systems are working in parallel, due to the problems such as the inverter systems' own factors and/or the voltage inconsistency among the DC buses of the inverter systems, it is easy to generate a large DC circular current, which will in turn affect a normal operation of the AC parallel system. In order to suppress the problem of the DC circular current, a usual approach is to detect a DC component on the AC output side of the inverter system, and then feed it back to a control voltage loop of an inverter bridge circuit in the inverter system, thereby suppressing the DC component of the inverter system.

Although the above method has a certain suppression effect, it is still unable to achieve a parallel operation for the AC parallel systems that do not share one DC bus and the voltages of the DC buses are largely different. For this reason, an embodiment in the present application proposes an inverter system that not only can effectively suppress the DC circulation current, but also is applicable in some parallel occasions that the inverter systems do not share one DC bus, thereby the related requirements for the inverter systems can be reduced. The inverter system will be described in detail below.

First Embodiment

Referring to FIG. 1, this embodiment proposes an inverter system 100. The inverter system 100 is mainly configured to convert an accessed power input into an AC output, so as to provide AC power to an AC load. As shown in FIG. 1, the inverter system 100 of this embodiment may be applied to an AC parallel system, and the AC parallel system connects AC sides of a plurality of inverter systems 100 in parallel for output, that is, the AC parallel system is connected to loads through a shared AC bus.

In this embodiment, the inverter system 100 is provided with a two-stage conversion circuit structure. For example, as shown in FIG. 1, the inverter system 100 includes a pre-conversion circuit 10, a post-conversion circuit 20, and a control circuit 30. Here, an input terminal of the pre-conversion circuit 10 is configured to connect to a power supply, an output terminal of the pre-conversion circuit 10 is connected to an input terminal of the post-conversion circuit 20, and a control terminal of the pre-conversion circuit 10 is connected to an output terminal of the control circuit 30; the input terminal of the post-conversion circuit 20 is connected to the output terminal of the pre-conversion circuit 10, an output terminal is configured to connect an AC load, and a control terminal is connected to the output terminal of the control circuit 30. Optionally, the inverter system 100 further includes the above-mentioned power supply, and the power supply is connected to the input terminal of the pre-conversion circuit 10. Here, the power supply may be a DC power supply or an AC power supply.

The pre-conversion circuit 10 is configured to convert the accessed power supply into a DC voltage and output the DC voltage to the post-conversion circuit 20. Here, a connection wire between the pre-conversion circuit 10 and the post-conversion circuit 20 is called a bus, and the DC voltage between the two conversion circuits is also called a DC bus voltage. It is worth noting that the DC voltage output by the pre-conversion circuit 10 of this embodiment should be adjustable. In order to suppress the DC circulation current during the parallel operation, when a DC component is detected in the AC output of the post-conversion circuit 20, the DC component may be used to adjust the DC bus voltage of the pre-conversion circuit 10 accordingly, thereby solving the above-mentioned problem such as the DC Circulation, etc.

In an embodiment, the pre-conversion circuit 10 is a DC-DC conversion circuit configured to realize conversion of DC voltages, for example, it may be a Buck circuit, a Boost circuit, or other voltage conversion circuit provided with a switch transistor device, etc. It should be understood that the power supply accessed at this time is a DC power supply, such as a storage battery, a solar panel, etc. In another embodiment, the pre-conversion circuit 10 may also be an AC-DC conversion circuit configured to realize conversion from an alternating current to a direct current. At this time, the input terminal of the pre-conversion circuit 10 is configured to access an AC power supply in. For example, in a parallel system such as an UPS (Uninterruptible Power Supply) etc., the AC power supply may provide mains power or alternating current output by a generator such as a wind power generator etc.

The post-conversion circuit 20 is configured to convert a direct current input from the pre-conversion circuit 10 into an alternating current for output. For example, the post-conversion circuit 20 mainly includes a bridge inverter unit configured to convert the direct current into the alternating current. Generally, the bridge inverter unit includes a plurality of bridge arm structures, each of which includes two power switch transistors connected in series. For example, the bridge inverter unit may be a two-phase bridge inverter circuit including two bridge arms, or a three-phase bridge inverter circuit including three bridge arms. Here, a midpoint of each of the bridge arms is used as a corresponding lead of the AC output terminal. Further, the post-conversion circuit 20 may further include an inductor connected in series with the AC output terminal of the bridge inverter unit, a capacitor connected in parallel with the AC output terminal, etc.

Figure 2:
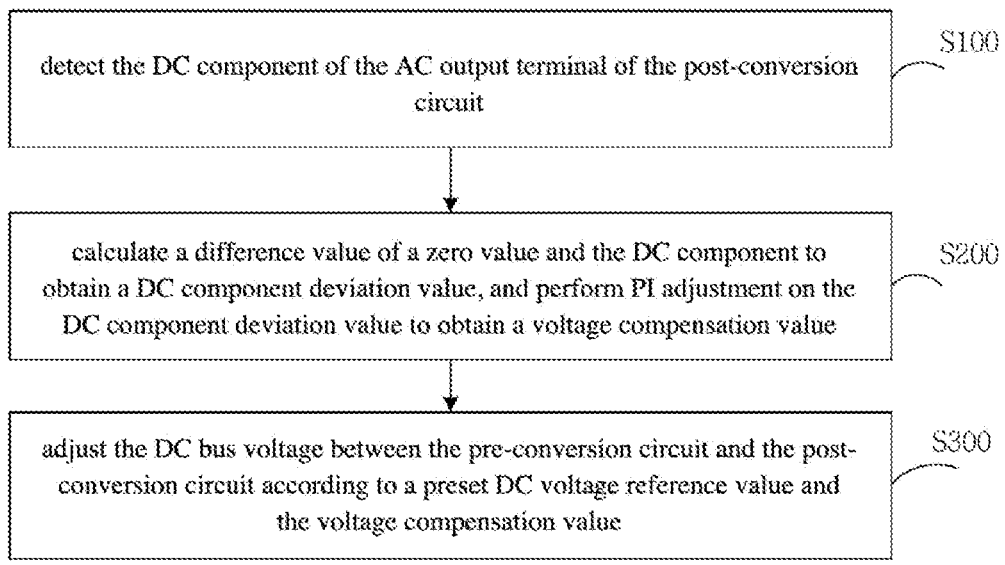
FIG. 2 shows a structural schematic diagram of an inverter system according to an embodiment in the present application.

The control circuit 30 is configured to implement inverter control of the entire system, which includes control of the conversion of the accessed DC power supply/AC power supply into the required DC bus voltage by the pre-conversion circuit 10, and control of the output of the alternating current by the post-conversion circuit 20. In addition, in order to solve the problem of the DC circulation current of the inverter system 100 showed in the occasion of the AC parallel operation as shown in FIG. 1, the control circuit 30 in this embodiment is further configured to adjust the DC bus voltage of the pre-conversion circuit 10 according to the DC component at the side of the AC output terminal of the post-conversion circuit 20. For example, as shown in FIG. 2, the inverter control process mainly includes the following.

At step S100, detect the DC component of the AC output terminal of the post-conversion circuit 20.

For example, the control circuit 30 may collect the DC component in the AC output at different positions of the post-conversion circuit 20, which is not limited herein.

Figure 3:
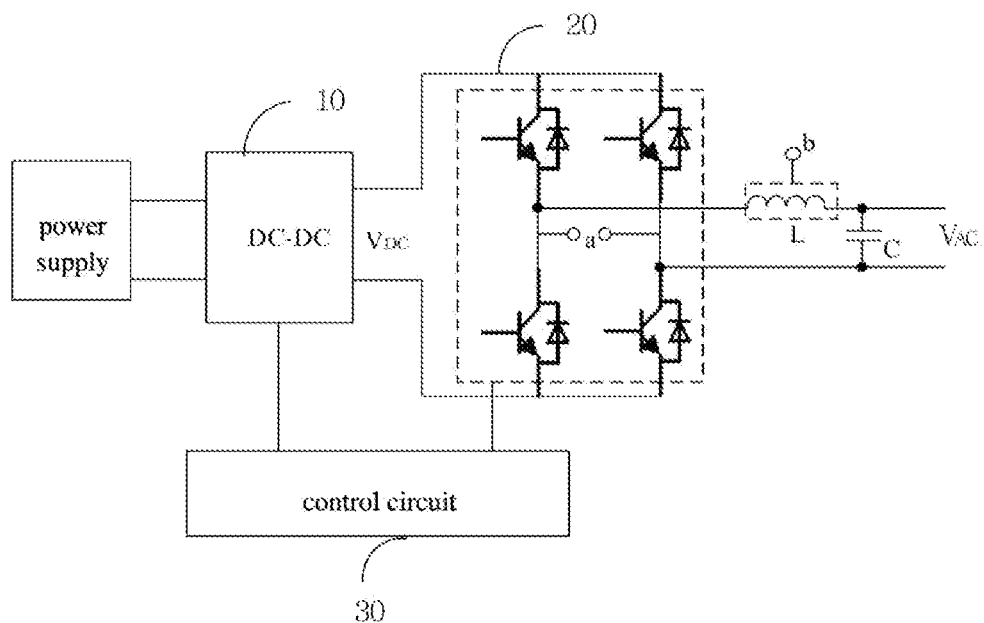
FIG. 3 shows an application schematic diagram of an inverter system according to an embodiment in the present application.

In a first implementation, the DC component of the AC output voltage between the midpoints of the bridge arms of the bridge inverter unit in the post-conversion circuit 20 (for example, at the position of the sampling points as shown in FIG. 3 and indicated by a) is detected, at this time the sampled component is a DC voltage component. For example, a signal may be sampled from the point a through a sampling resistor, and then the sampled signal may be input to an ADC (analog-to-digital converter) for conversion, thereby obtaining the above-mentioned DC component.

In a second implementation, the DC component of the current passing through the inductor in the post-conversion circuit 20 (for example, at the position of the sampling point as shown in FIG. 3 and indicated by b) is sampled, at this time the sampled component is a DC current component. For example, a current sensor such as a Hall sensor may be used to sample a signal from the point b, and then the sampled signal is input to an AD (analog-to-digital) converter for conversion, thereby obtaining the above-mentioned DC component.

Here, the AD converter may be a separate chip that converts an analog signal into a digital signal, or may be an AD conversion unit integrated in the control chip itself of the control circuit 30. It is understood that the implementation form of the AD converter is not limited.

At step S200, calculate a difference value of a zero value and the DC component to obtain a DC component deviation value, and perform PI adjustment on the DC component deviation value to obtain a voltage compensation value.

For example, the control circuit 30 first calculates the difference value of the zero value and the DC component to obtain the DC component deviation value, and then obtains the voltage compensation value through performing PI adjustment on the DC component deviation value, where the voltage compensation value is used for DC circulation current compensation.

It will be understood that the above-mentioned zero value is a given value, through calculating the difference value of the given value and the actual value, the deviation value between the two can be obtained, and this deviation value will be used for the subsequent compensation and adjustment operation. It is worth noting that the PI adjustment in this embodiment is a PI adjustment in a broad sense, for example, the adjustment may be performed through a PI (proportional-integral) regulator, or the adjustment may be performed through a P (proportional) regulator etc., the details of which may be set according to actual needs.

At step S300, adjust the DC bus voltage between the pre-conversion circuit 10 and the post-conversion circuit 20 according to a preset DC voltage reference value and the voltage compensation value.

For example, after obtaining the voltage compensation value, the control circuit 30 will calculate the control signal quantity of the pre-conversion circuit 10 through combining the preset DC voltage reference value and the voltage compensation value together, so that the pre-conversion circuit 10 outputs the expected DC bus voltage. Here, the preset DC voltage reference value is usually calculated based on the output target DC bus voltage under an ideal condition.

It can be understood that, through adjusting the DC bus voltage of the pre-conversion circuit 10 by using the DC component on the AC output side, it is possible to effectively prevent a large DC circulation current generated due to different DC bus voltages during the AC parallel operation of the inverter systems 100, thereby the stability of the AC parallel operation can be improved.

Figure 4:
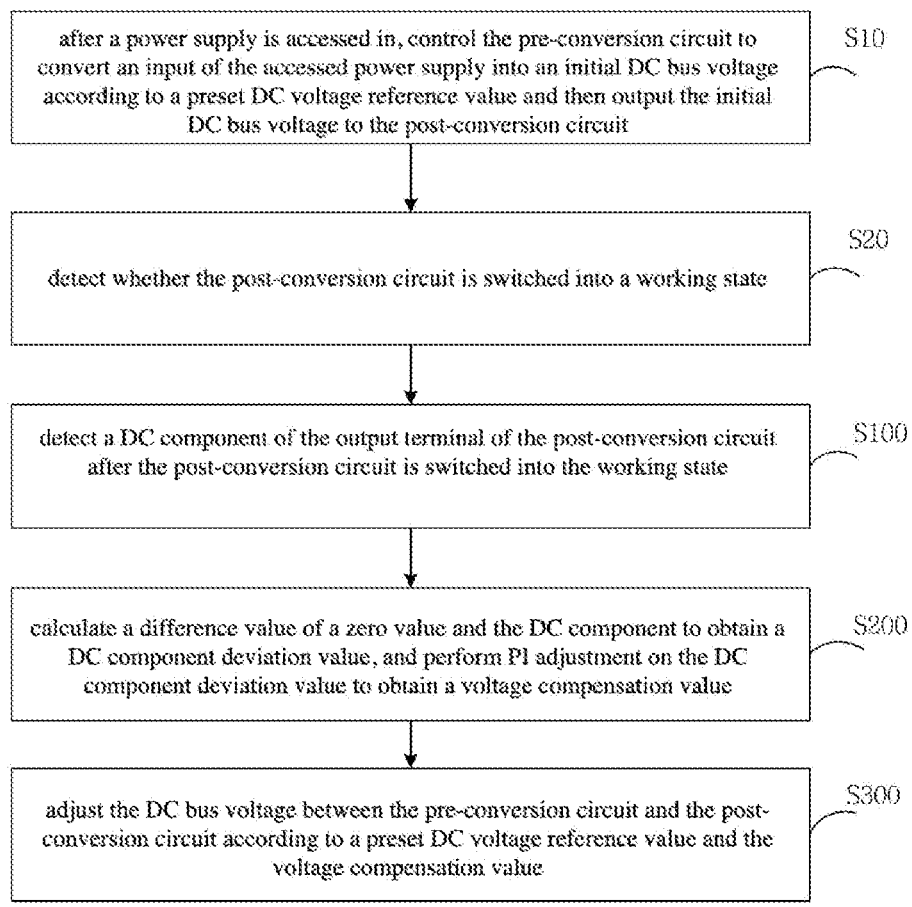
FIG. 4 shows a first control flow diagram of an inverter system according to an embodiment in the present application.

Generally, the post-conversion circuit 20 can start normally after the pre-conversion circuit 10 establishes a basic operating voltage. As shown in FIG. 4, before the post-conversion circuit 20 is switched into an operational state, the control circuit 30 of the inverter system 100, during the inverter control process, is further configured as follows.

At step S10, after a power supply is accessed in, control the pre-conversion circuit 10 to convert an input of the accessed power supply into an initial DC bus voltage according to a preset DC voltage reference value and then output the initial DC bus voltage to the post-conversion circuit 20.

Here, the initial DC bus voltage is used to start the post-conversion circuit 20 normally. It can be understood that the DC component and the voltage compensation value are both zero at the time before the post-conversion circuit 20 is not switched into an operational state.

At step S20, detect whether the post-conversion circuit 20 is switched into an operational state.

If it is detected that the post-conversion circuit is not switched into the operational state (that is, the AC current is not normally output), then the control circuit 30 will control the pre-conversion circuit 10 to continuously output the initial DC bus voltage until it is detected that the post-conversion circuit 20 has been switched into the operational state (that is, until the AC current can be normally output), then the above steps S100-S300 are executed.

Regarding the above-mentioned control circuit 30, in order to realize the corresponding control of the pre-conversion circuit 10 and the post-conversion circuit 20, in one implementation, the control circuit 30 may include the same control chip and its peripheral circuit, that is, the pre-conversion circuit 10 and the post-conversion circuit 20 are controlled by the same control chip, such as the inverter system 100 as shown in FIG. 1.

In another implementation, the control circuit 30 may include a pre-loop controller 310 and a post-loop controller 320 separately provided as shown in FIG. 4. It is worth noting that, if the separately provided pre-loop controller 310 and the post-loop controller 320 are used, since the voltage levels on the pre-loop controller and the post-loop controller are often different, it is necessary to provide an isolation design between the pre-loop controller and the post-loop controller. For example, the signal terminal of the pre-loop controller 310 and the signal terminal of the post-loop controller 320 are communication connected via a serial port or a bus, for example, they are communicated via a serial port or a CAN bus.

The control circuit 30 will be described below by taking the separately provided pre-loop controller 310 and the post-loop controller 320 as an example.

The pre-loop controller 310 is configured to control the pre-conversion circuit 10 to convert the accessed power supply into the required DC bus voltage, and is further configured to adjust the DC bus voltage based on the acquired DC component on the AC output side; and the post-loop controller 320 is configured to control the post-conversion circuit 20 to output the required AC current.

Figure 6:
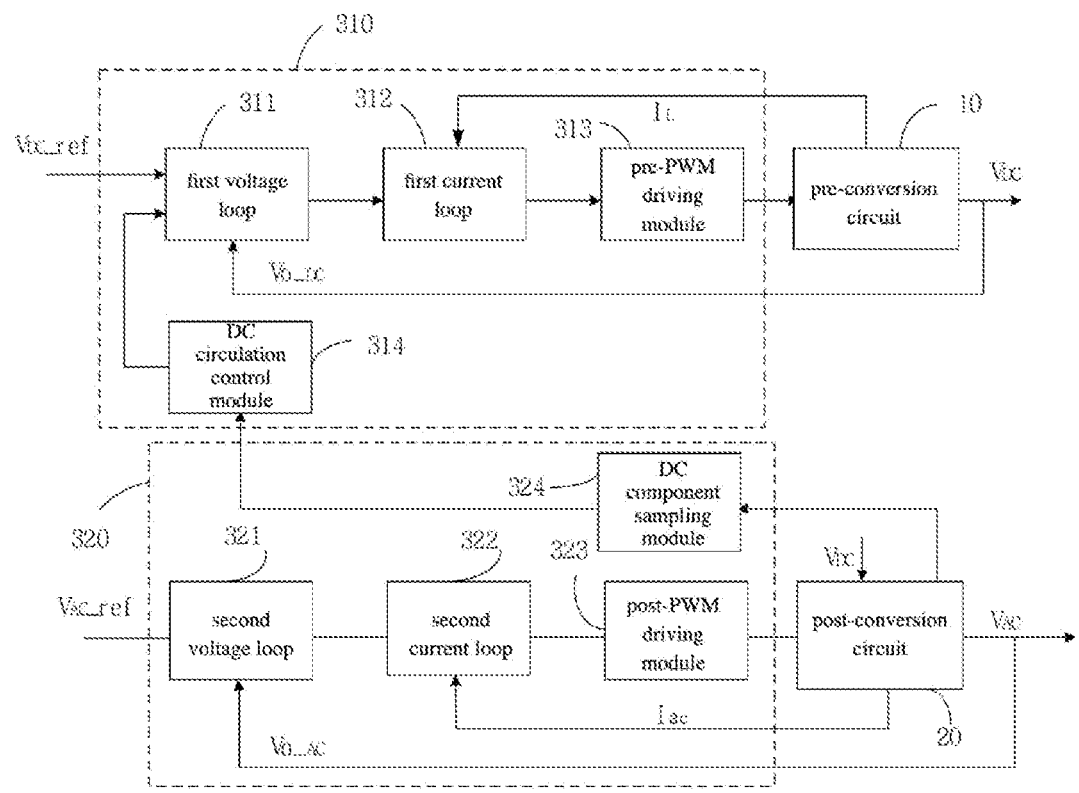
FIG. 6 shows a structural schematic diagram of a control circuit of an inverter system according to an embodiment in the present application.

In an implementation, as shown in FIG. 6, for example, the pre-loop controller 310 mainly includes a first voltage loop 311, a first current loop 312, and a pre-PWM driving module 313 connected in sequence, and a DC circulation control module 314. Here an input terminal of the first voltage loop 311 is connected to an output terminal of the DC circulation control module 314, an input terminal of the DC circulation control module 314 is connected to the post-loop controller 320; an output terminal of the pre-PWM driving module 313 is connected to a signal control terminal of the pre-conversion circuit 10.

As mentioned above, the DC circulation control module 314 may include a subtractor and a PI regulator, etc., the subtractor is configured to achieve the computation of the difference value of the zero value and the DC component to obtain the DC component deviation value; the PI regulator is configured to adjust the DC component deviation value through a preset PI adjustment coefficient to obtain the voltage compensation value. The PI adjustment coefficient may be set according to an actual requirement, which is not limited herein.

As mentioned above, the first voltage loop 311 is configured to calculate a corrected voltage value based on the voltage compensation value output from the DC circulation control module 314 and the preset DC voltage reference value VDC_ref, and calculate a first voltage value based on the sampled DC voltage value Vo_DC output by the pre-conversion circuit 10 and the corrected voltage value. Furthermore, the first current loop 312 calculates a pre-control signal quantity based on the first voltage value and the sampled current value IL flowing through the inductor in the pre-conversion circuit 10. Here, the current input into the first current loop 312 depends on the type of the accessed power source, for example, if the input is from an AC power source, then the sampled inductor current is an AC current, etc. Finally, the pre-PWM driving module 313 drives a switch transistor in the pre-conversion circuit 10 according to the pre-control signal quantity to output the required DC bus voltage.

It is worth noting that, the first voltage loop 311, the first current loop 312, and the pre-PWM driving module 313 may be implemented by a circuit structure of separate hardware, or may be implemented by an integrated control chip. It can be understood that, the aforementioned DC voltage value Vo_DC and the current value IL may both be obtained through sampling by the corresponding pre-sampling circuits in the pre-loop controller 310, which will not be further described herein.

In an implementation, as shown in FIG. 6, for example, the post-loop controller 320 mainly includes a second voltage loop 321, a second current loop 322, and a post-PWM driving module 323 connected in sequence, and a DC component sampling module 324, here the DC component sampling module 324 is connected to an output terminal of the post-conversion circuit 20, and an output terminal of the post-PWM driving module 323 is connected to a signal control terminal of the post-conversion circuit 20.

As mentioned above, the DC component sampling module 324 is configured to sample a DC component signal from an AC output terminal of the post-conversion circuit 20, and convert the sampled signal through an AD converter to obtain the DC component. The DC component is sent to the DC circulation control module 314 for performing the circular DC current compensation. For example, the DC component sampling module 324 may include a sampling resistor or a Hall sensor, and an AD converter, etc.

It should be understood that the DC component sampling module 324 may also be located in the pre-loop controller 310, that is, it is detected by the pre-loop controller 310, but attention should be paid to the isolation design during the pre-sampling, for example, the pre-loop controller 310 may adopt an isolated operational amplifier and sampling circuit or the like for sampling.

As mentioned above, the second voltage loop 321 is configured to calculate a second voltage value based on the preset AC voltage reference value VAC_ref and the sampled AC voltage value Vo_AC output by the post-conversion circuit 20; the second current loop 322 is configured to calculate a post-control signal quantity according to the second voltage value and the AC current value Iac sampled in the post-conversion circuit 20; further, the post-PWM driving module 323 is configured to drive power switch transistors in the post-conversion circuit 20 according to the post-control signal quantity to output AC power, which includes AC voltage and AC current.

It is worth noting that the second voltage loop 321, the second current loop 322, and the post-PWM driving module 323 may be implemented by a circuit structure of separate hardware, or may be implemented by an integrated controller chip. It can be understood that, the AC voltage value Vo_AC and the AC current value Iac may be obtained through sampling by the corresponding post-sampling circuit in the post-loop control unit, which will not be further described herein.

The inverter system of this embodiment is provided with two conversion circuits. Through detecting the DC component on the AC output side of the post-conversion circuit, and adjusting the DC voltage output of the pre-conversion circuit according to the detected DC component, it is possible to effectively suppress the Circular DC current generated in the parallel system during the working process of the parallel operation, and then the inverter conversion efficiency can be improved, thereby the service life of the power devices can be prolonged. Moreover, in addition to effectively suppressing the Circular DC current, the specification requirements for the model or manufacturer of the parallel inverter system can also be reduced. For example, there is no need to strictly guarantee the DC bus voltage levels within each of the inverter systems, and the accessed power sources can be independent of each other for these parallel inverter systems, thereby greatly broadening application occasions of the parallel inverter systems.

Second Embodiment

Referring to FIG. 1 and FIG. 2, based on the inverter system 100 of the foregoing first embodiment, this embodiment proposes a method for controlling an inverter system. For example, as shown in FIG. 1, the inverter system 100 includes a pre-conversion circuit 10, a post-conversion circuit 20 and a control circuit 30. An input terminal of the pre-conversion circuit 10 is configured to connect a power supply, an output terminal of the pre-conversion circuit 10 is connected to the post-conversion circuit 20, and a signal control terminal of the pre-conversion circuit 10 is connected to an output terminal of the control circuit 30. An input terminal of the post-conversion circuit 20 is connected to the output terminal of the pre-conversion circuit 10, an output terminal of the post-conversion circuit 20 is configured to connect an AC load, and a signal control terminal of the post-conversion circuit 20 is connected to the output terminal of the control circuit 30. Here, the pre-conversion circuit 10 is configured to convert a voltage of the power supply into a DC voltage and output the DC voltage to the post-conversion circuit 20; the DC voltage between the pre-conversion circuit 10 and the post-conversion circuit 20 is the DC bus voltage; and the post-conversion circuit 20 is configured to convert the DC bus voltage into an AC voltage.

Figure 5:
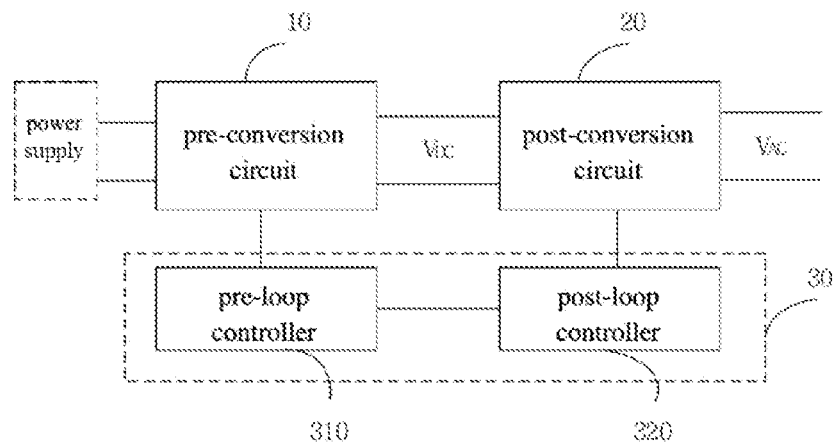
FIG. 5 shows a second control flow diagram of an inverter system according to an embodiment in the present application.

It can be understood that the structures and functions of the pre-conversion circuit 10 and the post-conversion circuit 20 are the same as those in the above-mentioned first embodiment, which will not be repeated herein again. It should be understood that the implementation form of the control circuit 30 in the inverter system 100 of this embodiment is not limited, for example, the control circuit 30 may be implemented in the form of sharing the same controller chip as shown in FIG. 1, or may be implemented by separately providing the pre-loop controller 310 and the post-loop controller 320 as shown in FIG. 5, and the like.

As shown in FIG. 2, the control circuit 30 will implement the following method for inverter control, which includes:

at step S100, detecting a DC component of the output terminal of the post-conversion circuit 20;

at step S200, calculating a difference value of a zero value and the DC component to obtain a DC component deviation value, and performing PI adjustment on the DC component deviation value to obtain a voltage compensation value;

at step S300, adjusting the DC bus voltage between the pre-conversion circuit 10 and the post-conversion circuit 20 according to a preset DC voltage reference value and the voltage compensation value.

It can be understood that the method for controlling an inverter system in this embodiment is applicable to the inverter system 100 in the foregoing first embodiment. Regarding the specific description for these steps, reference may be made to the foregoing first embodiment, which will not be repeated herein again. Some optional options of the inverter system 100 in the foregoing first embodiment are also applicable to this embodiment, which will not be repeated herein again.

Third Embodiment

Referring to FIG. 1, this embodiment further proposes a parallel inverter system, which is applicable to different occasions such as a mobile energy storage power supply with multiple batteries operated in parallel, a UPS parallel system, or a distributed microgrid power generation system, etc.

For example, the parallel inverter system may include a plurality of inverter systems, where the AC output terminals of the inverter systems are connected in parallel and output AC power through a shared AC bus, as shown in FIG. 1. In this embodiment, each of the inverter system may adopt the inverter system 100 in the foregoing first embodiment, and some options in the foregoing first embodiment are also applicable to this embodiment.

As shown in FIG. 2, during the inverter control process, the control circuit 30 of each of the inverter systems 100 may be configured to: detect the DC component of the output terminal of the post-conversion circuit 20, calculate a difference value of a zero value and the DC component to obtain a DC component deviation value, and perform PI adjustment on the DC component deviation value to obtain a voltage compensation value; and adjust the DC bus voltage between the pre-conversion circuit 10 and the post-conversion circuit 20 according to a preset DC voltage reference value and the voltage compensation value, so as to achieve circular DC current suppression and make the parallel inverter system operate stably etc.

Regarding the parallel inverter system, since each of the inverter systems can adjust its DC bus voltage according to the detected DC component in the AC output, on the one hand the generated DC component can be offset or compensated, and on the other hand the DC bus voltages can be kept consistent, thereby suppressing the circular DC current. It can be understood that, for these parallel inverter systems, even if their DC buses are not shared, the parallel operation can also be achieved. Therefore, it is possible for users to implement parallel operation of inverter systems from different manufacturers or with different models, which greatly broadens the usage scenarios and practicability of the AC parallel operation, and can further improve user experience.

In all the examples shown and described herein, any specific value should be interpreted as merely exemplary, rather than as a limitation, and therefore, different values may be provided in other examples of the exemplary embodiments.

It should be noted that, similar reference numerals and letters in the accompanying drawings indicate similar items, therefore, once a certain item is defined in one drawing, then there is no need to further define and explain this item in the accompanying drawings.

The foregoing embodiments only present several implementations of the present application, and the descriptions are relatively specific and detailed, however, the foregoing embodiments should not be understood as limitation to the scope of the present application. It should be pointed out that, for those of ordinary skill in the art, several modifications and improvements may be made without departing from the concept of the present application, and all these modifications and improvements fall within the protection scope of the present application.

What is claimed is:

1. An inverter system, comprising a pre-conversion circuit, a post-conversion circuit, and a control circuit, wherein:
   an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;
   an output terminal of the post-conversion circuit is configured to connect to an AC load, and a signal control terminal of the post-conversion circuit is connected to the output terminal of the control circuit;
   the pre-conversion circuit is configured to convert a voltage of the power supply into a DC voltage and output the DC voltage to the post-conversion circuit;
   the DC voltage between the pre-conversion circuit and the post-conversion circuit is a DC bus voltage;
   the post-conversion circuit is configured to convert the DC bus voltage into an AC voltage;
   the control circuit is configured to detect a DC component of the output terminal of the post-conversion circuit; and
   the control circuit is configured to calculate a difference value of a zero value and the DC component to obtain a DC component deviation value, perform PI adjustment on the DC component deviation value to obtain a voltage compensation value, and adjust the DC bus voltage between the pre-conversion circuit and the post-conversion circuit according to a preset DC voltage reference value and the voltage compensation value.

2. The inverter system according to claim 1, wherein:
   the post-conversion circuit comprises a bridge inverter unit and an inductor;
   an input terminal of the bridge inverter unit is connected to the output terminal of the pre-conversion circuit, an output terminal of the bridge inverter unit is connected to the inductor in series, and a signal control terminal of the bridge inverter unit is connected to the output terminal of the control circuit; and
   the control circuit is configured to detect the DC component of a voltage between midpoints of bridge arms in the bridge inverter unit or detect the DC component of a current passing through the inductor.

3. The inverter system according to claim 2, wherein the bridge inverter unit is a two-phase bridge inverter circuit or a three-phase bridge inverter circuit.

4. The inverter system according to claim 2, wherein the post-conversion circuit further comprises a capacitor connected in parallel to the output terminal of the bridge inverter unit.

5. The inverter system according to claim 2, wherein the bridge inverter unit comprises a plurality of bridge arm structures with each of the bridge arm structure comprising two power switch transistors connected in series.

6. The inverter system according to claim 1, wherein, before the post-conversion circuit is switched into an operational state, the control circuit is configured to control the pre-conversion circuit to convert the power supply into an initial DC bus voltage according to the preset DC voltage reference value and then output the initial DC bus voltage to the post-conversion circuit.

7. The inverter system according to claim 1, wherein the control circuit comprises a pre-loop controller and a post-loop controller, and a signal terminal of the pre-loop controller and a signal terminal of the post-loop controller are communication connected through a serial port or a bus; and
   the signal control terminal of the pre-conversion circuit is connected to an output terminal of the pre-loop controller, and the signal control terminal of the post-conversion circuit is connected to an output terminal of the post-loop controller.

8. The inverter system according to claim 7, wherein:
   the pre-loop controller comprises a DC circulation control module, a first voltage loop, a first current loop, and a pre-PWM driving module;
   an input terminal of the DC circulation control module is connected to the post-loop controller, an input terminal of the first voltage loop is connected to an output terminal of the DC circulation control module, an input terminal of the first current loop is connected to an output terminal of the first voltage loop, an output terminal of the first current loop is connected to an input terminal of the pre-PWM driving module, and an output terminal of the pre-PWM driving module is connected to the signal control terminal of the pre-conversion circuit;
   the DC circulation control module is configured to obtain the DC component, calculate the difference value of the zero value and the DC component to obtain the DC component deviation value, and adjust the DC component deviation value through a preset PI adjustment coefficient to obtain the voltage compensation value;
   the first voltage loop is configured to calculate a corrected voltage value according to the preset DC voltage reference value and the voltage compensation value, and calculate a first voltage value according to a DC voltage value sampled at the output terminal of the pre-conversion circuit and the corrected voltage value;

the first current loop is configured to calculate a pre-control signal quantity according to the first voltage value and a current value sampled in the pre-conversion circuit; and the pre-PWM driving module is configured to drive a switch transistor in the pre-conversion circuit according to the pre-control signal quantity to output the DC voltage.

9. The inverter system according to claim 8, wherein the DC circulation control module comprises a subtractor and a PI regulator;

the subtractor is configured to realize the calculation of the difference value of the zero value and the DC component to obtain the DC component deviation value; and the PI regulator is configured to adjust the DC component deviation value through a preset PI adjustment coefficient to obtain the voltage compensation value.

10. The inverter system according to claim 7, wherein:

the post-loop controller comprises: a DC component sampling module; and a second voltage loop, a second current loop, and a post-PWM driving module connected in sequence;

an input terminal of the DC component sampling module is connected to the output terminal of the post-conversion circuit, and an output terminal of the post-PWM driving module is connected to the signal control terminal of the post-conversion circuit;

the DC component sampling module is configured to sample a DC component signal from the output terminal of the post-conversion circuit, and convert the sampled signal through an AD converter to obtain the DC component; the post-loop controller transmits the DC component to the pre-loop controller by means of communication;

the second voltage loop is configured to calculate a second voltage value according to a preset AC voltage reference value and an AC voltage value sampled at the output terminal of the post-conversion circuit;

the second current loop is configured to calculate a post-control signal quantity according to the second voltage value and the current value sampled in the post-conversion circuit; and the post-PWM driving module is configured to drive a switch transistor in the post-conversion circuit according to the post-control signal quantity to output an alternating current.

11. The inverter system according to claim 1, wherein the pre-conversion circuit is a DC-DC conversion circuit or an AC-DC conversion circuit.

12. The inverter system according to claim 1, wherein the pre-conversion circuit is a Buck circuit, a Boost circuit, or a voltage conversion circuit comprising a switch transistor device.

13. An inverter system, comprising: a pre-conversion circuit, a post-conversion circuit, and a control circuit, wherein:

an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;

an output terminal of the post-conversion circuit is configured to connect to an AC load, and a signal control terminal of the post-conversion circuit is connected to the output terminal of the control circuit;

the pre-conversion circuit is configured to convert a voltage of the power supply into a DC voltage and output the DC voltage to the post-conversion circuit; the DC voltage between the pre-conversion circuit and the post-conversion circuit is a DC bus voltage;

the post-conversion circuit is configured to convert the DC bus voltage into an AC voltage;

the control circuit is configured to detect a DC component of the output terminal of the post-conversion circuit;

the control circuit is configured to calculate a difference value of a zero value and the DC component to obtain a DC component deviation value, perform PI adjustment on the DC component deviation value to obtain a voltage compensation value, and adjust the DC bus voltage between the pre-conversion circuit and the post-conversion circuit according to a preset DC voltage reference value and the voltage compensation value;

the control circuit comprises a pre-loop controller and a post-loop controller, and a signal terminal of the pre-loop controller and a signal terminal of the post-loop controller are communication connected through a serial port or a bus; the signal control terminal of the pre-conversion circuit is connected to an output terminal of the pre-loop controller, and the signal control terminal of the post-conversion circuit is connected to an output terminal of the post-loop controller;

the pre-loop controller comprises a DC circulation control module, a first voltage loop, a first current loop, and a pre-PWM driving module;

an input terminal of the DC circulation control module is connected to the post-loop controller, an input terminal of the first voltage loop is connected to an output terminal of the DC circulation control module, an input terminal of the first current loop is connected to an output terminal of the first voltage loop, an output terminal of the first current loop is connected to an input terminal of the pre-PWM driving module, and an output terminal of the pre-PWM driving module is connected to the signal control terminal of the pre-conversion circuit;

the DC circulation control module is configured to obtain the DC component, calculate the difference value of the zero value and the DC component to obtain the DC component deviation value, and adjust the DC component deviation value through a preset PI adjustment coefficient to obtain the voltage compensation value;

the first voltage loop is configured to calculate a corrected voltage value according to the preset DC voltage reference value and the voltage compensation value, and calculate a first voltage value according to a DC voltage value sampled at the output terminal of the pre-conversion circuit and the corrected voltage value;

the first current loop is configured to calculate a pre-control signal quantity according to the first voltage value and a current value sampled in the pre-conversion circuit; and the pre-PWM driving module is configured to drive a switch transistor in the pre-conversion circuit according to the pre-control signal quantity to output the DC voltage.

14. A method for controlling an inverter system, the inverter system comprises a pre-conversion circuit, a post-conversion circuit, and a control circuit;

an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;

an output terminal of the post-conversion circuit is configured to connect to an AC load, and a signal control terminal of the post-conversion circuit is connected to the output terminal of the control circuit;

the pre-conversion circuit is configured to convert a voltage of the power supply into a DC voltage and output the DC voltage to the post-conversion circuit; the DC voltage between the pre-conversion circuit and the post-conversion circuit is a DC bus voltage;

the post-conversion circuit is configured to convert the DC bus voltage into an AC voltage;

the control circuit implements a method as follows for inverter control, and the method comprises:

detecting a DC component of the output terminal of the post-conversion circuit;

calculating a difference value of a zero value and the DC component to obtain a DC component deviation value, and performing PI adjustment on the DC component deviation value to obtain a voltage compensation value; and adjusting the DC bus voltage between the pre-conversion circuit and the post-conversion circuit according to a preset DC voltage reference value and the voltage compensation value.

15. The method for controlling an inverter system according to claim 14, wherein the method for controlling an inverter system further comprises:

after the power supply is accessed, controlling, by the control circuit, the pre-conversion circuit to convert an input of the accessed power supply into an initial DC bus voltage according to a preset DC voltage reference value, and then outputting the initial DC bus voltage to the post-conversion circuit;

detecting, by the control circuit, whether the post-conversion circuit is switched into an operational state; and after detecting that the post-conversion circuit is switched into the operational state, executing, by the control circuit, step of detecting the DC component of the output terminal of the post-conversion circuit and the subsequent steps.

16. The method for controlling an inverter system according to claim 15, wherein the method for controlling an inverter system further comprises:

if it is detected that the post-conversion circuit is not switched into the operational state, controlling, by the control circuit, the pre-conversion circuit to continuously output the initial DC bus voltage to the post-conversion circuit.

17. A parallel inverter system, comprising a plurality of inverter systems, wherein AC output terminals of the plurality of inverter systems are connected in parallel, and each of the inverter systems comprises a pre-conversion circuit, a post-conversion circuit, and a control circuit, wherein an input terminal of the pre-conversion circuit is configured to connect to a power supply, an output terminal of the pre-conversion circuit is connected to an input terminal of the post-conversion circuit, and a signal control terminal of the pre-conversion circuit is connected to an output terminal of the control circuit;

an output terminal of the post-conversion circuit is configured to connect to an AC load, and a signal control terminal of the post-conversion circuit is connected to the output terminal of the control circuit;

the pre-conversion circuit is configured to convert a voltage of the power supply into a DC voltage and output the DC voltage to the post-conversion circuit; the DC voltage between the pre-conversion circuit and the post-conversion circuit is a DC bus voltage;

the post-conversion circuit is configured to convert the DC bus voltage into an AC voltage;

the control circuit is configured to detect a DC component of the output terminal of the post-conversion circuit; and the control circuit is configured to calculate a difference value of a zero value and the DC component to obtain a DC component deviation value, perform PI adjustment on the DC component deviation value to obtain a voltage compensation value, and adjust the DC bus voltage between the pre-conversion circuit and the post-conversion circuit according to a preset DC voltage reference value and the voltage compensation value.

* * * * *